Sept. 15, 1936.  H. NIELSEN  2,054,709
HEADLIGHT
Filed June 6, 1935  2 Sheets-Sheet 1
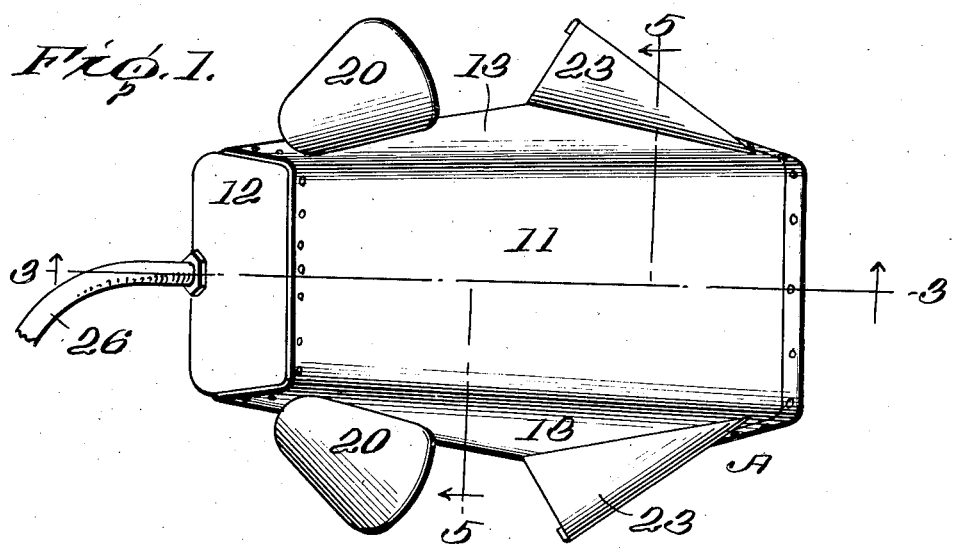
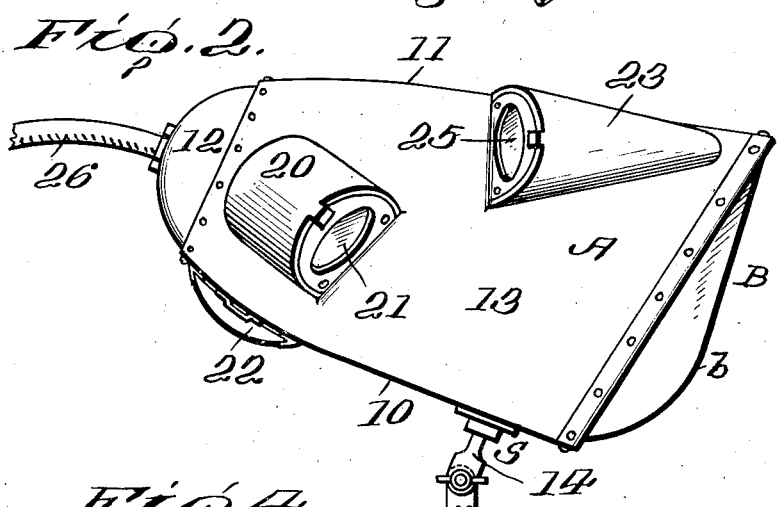
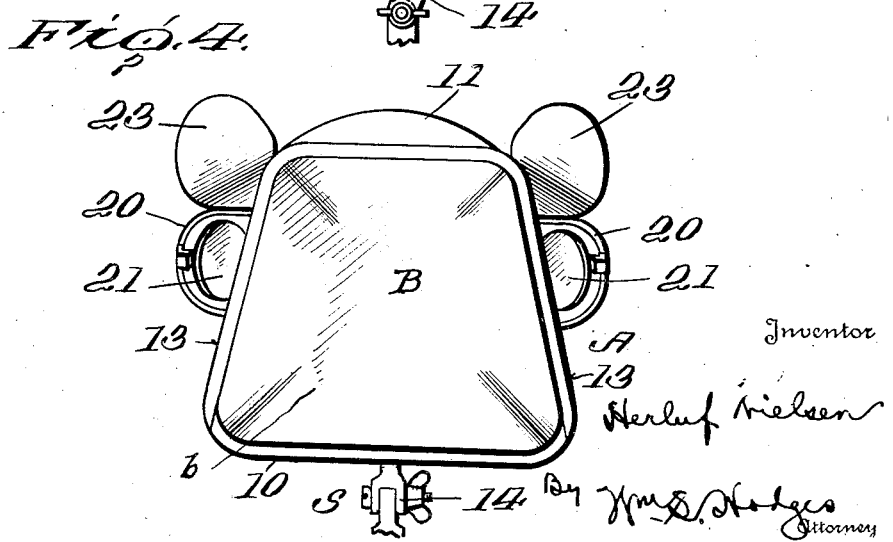
Inventor
Herluf Nielsen
By Wm. D. Hodges
Attorney Sept. 15, 1936.   H. NIELSEN   2,054,709
HEADLIGHT
Filed June 6, 1935   2 Sheets-Sheet 2
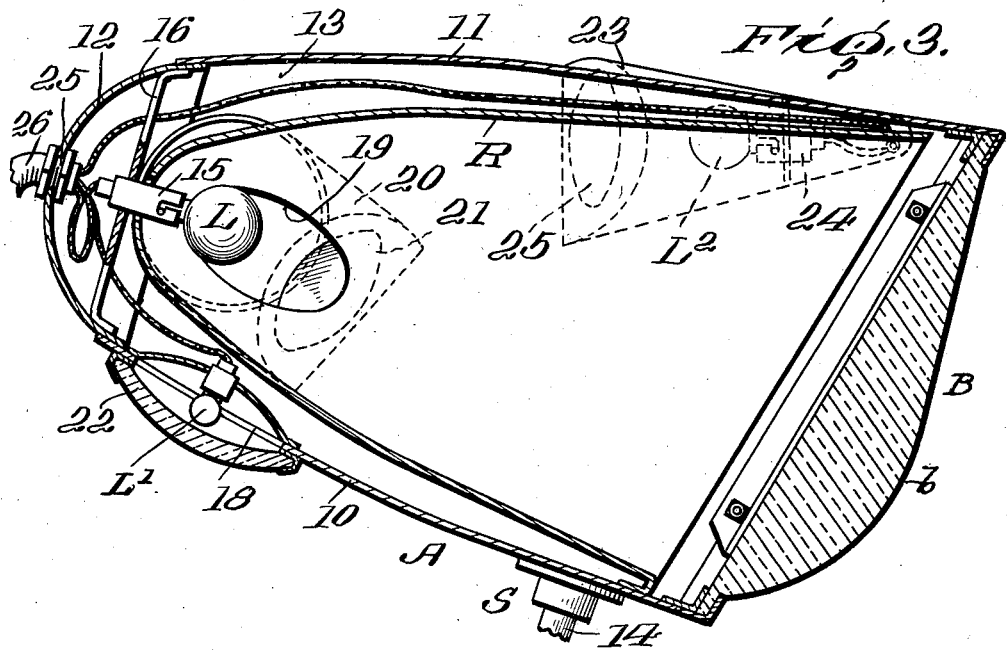
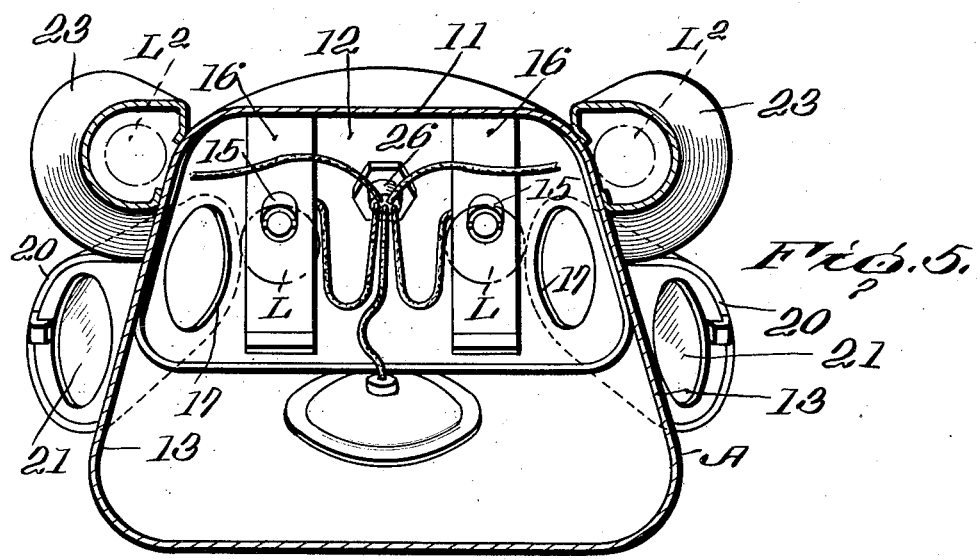
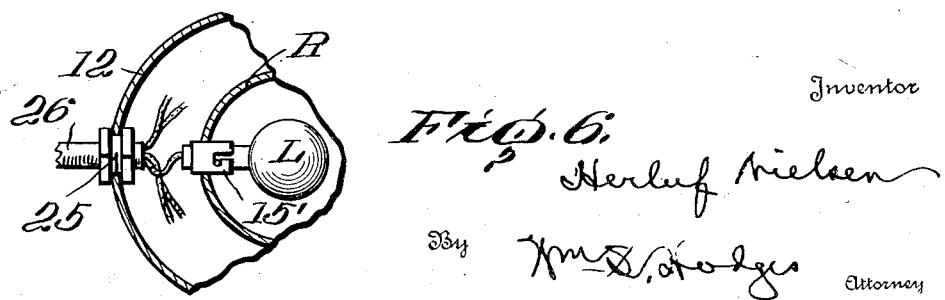

Patented Sept. 15, 1936

2,054,709

UNITED STATES PATENT OFFICE 2,054,709

HEADLIGHT

Herluf Nielsen, New York, N. Y.

Application June 6, 1935, Serial No. 25,323

3 Claims. (Cl. 240—7.1)

This invention is a headlight which is primarily designed for use on motor vehicles, but its application is not limited to such use.

One of the objects of the invention is to provide a headlight so constructed and arranged as to project a beam of light forwardly over the roadway, in such manner as to adequately illuminate the latter, but at the same time prevent the beam from being directed into the eyes of drivers of approaching vehicles. A further object is to provide a simple form of headlight of the type mentioned, provided with means for adequately illuminating the sides of the roadway and the ditches along the same. A further object is to provide means by which the front of a vehicle, which may be equipped with the headlight may be brilliantly illuminated, so as to make it readily visible to drivers of approaching cars. A further object is to produce a headlight, so constructed and arranged that a single casing may be substituted for, and arranged to perform the functions of the two laterally disposed headlights, which are now standard equipment on motor vehicles.

The invention will be hereinafter fully set forth and particularly pointed out in the claims.

In the accompanying drawings:

Figure 1 is a top plan view of a headlight structure conforming to the invention. Figure 2 is a side elevation. Figure 3 is a longitudinal sectional view on the line 3—3, Figure 1. Figure 4 is a front elevation. Figure 5 is a transverse sectional view on the line 5—5, Figure 1, with the reflector removed, and Figure 6 is a detail sectional view illustrating a modification of the lamp support.

Referring to the drawings, A designates the casing of the headlight which consists of a bottom wall 10 and a top wall 11, said bottom and top walls being connected by side walls 13, and a rear wall 12. The casing may be supported in any desired manner, as by means of the usual shank S, and a bracket 14, the headlight being supported in a generally sloping position, with the front edge of the opening lower than the rear edge thereof. It will be observed that the top, bottom and side walls are of approximately trapezoidal form, all of them having their narrowest edges at the rear and connected by a curved rear wall. Each side wall has two marginal portions joining the top and bottom walls, respectively, and another edge merging into the rear wall, the front and rear edges of the bottom wall being wider than the corresponding edge of the top wall, the forward edges of the top, bottom and side walls defining a downwardly and rearwardly inclined opening of approximately trapezoidal form. It will also be observed that the inclination of the top wall is at a slightly different angle from the angle of inclination of the bottom wall, and that the side walls diverge in a forward direction so as to produce a general flaring construction, the overhang of the top wall being so arranged as to prevent projection of any portion of the light into the eyes of the driver of an approaching vehicle.

The front opening of the casing A is preferably closed by a lens B having a convexed outer face, the curvature of the lower portion being greater than that of the upper portion, as indicated at b.

One or more lamps L may be employed to produce the desired illumination, but for purposes of illustration two are shown. The lamps may be of any suitable or desirable construction, and are preferably removably supported in standard type sockets 15, each of which is carried by a thin metal supporting strip 16, having offset ends which are anchored to the top and bottom walls 10 and 11, with the strips in laterally spaced relation, said strips being located just forward of the back wall of the headlight casing. Each side wall 13 is provided with an opening 17, and the bottom wall 10 is provided with an opening 18, said side openings being so positioned that portions of the beams of light emanating from the lamps may pass laterally and forwardly therethrough. A suitable reflector R is located within the casing, in a position to hide the strips 16, and in focus with the lamps, said reflector having openings 19, which register with the openings 17 in the side walls, so as to allow the illumination from the lamps to pass to and through said openings 17. From the drawings it will be observed that the reflector R roughly conforms to the interior contour of the casing A, and is provided with a front opening, the upper portion of which is in a vertical plane in advance of the lower portion thereof, so as to conform to the contour of the forward opening of the casing. The rear end of the reflector is spaced from and conforms to the contour of the back wall of the casing. Arranged along the outer face of each side wall is a laterally, forwardly and downwardly inclined tubular casing 20, open at its forward end and closed at the rear end, said open end being normally covered by a suitable lens 21. The inner side wall of each casing is provided with an opening which is in register with one of the openings 17, the arrangement being such that illumination from the interior of the lamp casing is directly projected through the openings 17 into the respective casings 20, and is then projected indirectly outward through the lenses 21. Located within the casing, back of the reflector R is a lamp L', in a position to direct its beam downwardly through the opening 18, the latter being covered by a suitable translucent covering or lens 22, in a manner well known in the art.

Mounted on each side wall 13 is an auxiliary lamp casing 23, provided with a lamp socket 24 carrying a lamp L², said casings having openings at their rear ends covered by suitable lenses 25. The lamps L² are located within said casing 23 in such manner that the light projected therefrom is directed rearwardly, so as to illuminate the front portion of the vehicle. The casings 23 are preferably positioned at the upper forward corners of the main casing A, so that the tubular casings will not interfere with the projection of light from auxiliary casing 20.

The various lamps may be connected with a suitable source of current in any desired manner. For purposes of illustration, the rear wall is provided with an opening 25 for an electric cable 26, which is provided with branches leading to the respective lamps, in a well known manner.

In the modification shown in Figure 6, the supporting strips 16 shown in the other figures are dispensed with, and the lamp sockets 15' are supported directly within openings formed in the rear end of the reflector.

The advantages of the invention will be readily understood by those skilled in the art to which it belongs. An important advantage is that the headlight may be supported in a position midway between the fenders of a standard type of motor vehicle, and when so supported the beams from the lamps L will be projected forwardly and reflected downwardly, in a manner to effectively illuminate the roadway ahead of the machine. At the same time the beams will be directed in such manner that they cannot reach the eyes of drivers of approaching vehicles, because the forward portion of the top wall of the casing will intercept those upwardly projected beams, which normally would be objectionable. Simultaneously, the roadway midway between the wheels is illuminated by the beam of light passing downwardly through opening 18, in the bottom of the casing. Light is also directed laterally through the openings 17 and the tubular casings 20, so as to illuminate space located laterally and forwardly with respect to the course of travel of the vehicle. It will also be observed that the lamps in the auxiliary casings 23 are so positioned that the radiator, as well as the fenders of the car will be brilliantly illuminated, but yet none of the light projected from these casings 23 will be directed into the eyes of the driver, because in practice the plane of the lamps is preferably near the bottom of the engine radiator, and in such position that the projected beams are interrupted by the radiators and fenders. A very important advantage is that full and effective illumination of the roadway is obtained without possible glare in the eyes of approaching drivers, and restful illumination is provided for the driver of the vehicle equipped with the headlight embodying the invention.

Having thus explained the nature of the invention and described an operative manner of constructing and using the same, although without attempting to set forth all of the forms in which it may be made, or all of the forms of its use, what is claimed is:

1. A headlight of the character described comprising a casing provided with top, bottom and side walls respectively, each of approximately trapezoidal form and each with its narrower edge to the rear, and also having a curved back wall joining the rear edges of the other walls, said top and bottom walls diverging forwardly from said back wall, and said side walls extending forwardly and downwardly from the back wall in diverging relation and joining the top and bottom walls respectively in such manner that the front edges of said top, side and bottom walls define an inclined front opening of approximately trapezoidal form with the forward edge of the top wall in a vertical plane which is in advance of the forward edge of the bottom wall, said side walls each having an opening therein, lamp supporting means within the casing, laterally, forwardly and downwardly inclined tubular casings arranged along the outer faces of the respective side walls, each casing being open at its forward end and closed at its rear end, said open end being normally covered by a lens, the inner wall of each casing having a lateral opening in register with a side opening in said casing, said openings and said casings being so constructed and arranged that illumination from lamps carried by said lamp-supporting means will be directly projected through each of the side openings into said casings and then indirectly outward through the open ends of said casings, the forward edge of the top wall of the casing being in a position to interrupt upwardly and forwardly directed portions of the light beam projected from said casing.

2. A headlight of the character described comprising a casing provided with top, bottom and side walls respectively, each of approximately trapezoidal form each with its narrower edge to the rear and also having a curved back wall joining the rear edges of the other walls, said top and bottom walls diverging forwardly from said back wall, and said side walls extending forwardly and downwardly from the back wall in diverging relation and joining the top and bottom walls respectively in such manner that the front edges of said top, side and bottom walls define an inclined front opening of approximately trapezoidal form with the forward edge of the top wall in a vertical plane which is in advance of the forward edge of the bottom wall, said side walls each having an opening therein, lamp-supporting means within the casing, laterally, forwardly and downwardly inclined tubular casings arranged along the outer faces of the respective side walls, each casing being open at its forward end and closed at its rear end, said open end being normally covered by a lens, the inner wall of each casing having a lateral opening in register with a side opening in said casing, said openings and said casings being so constructed and arranged that illumination from lamps carried by said lamp-supporting means will be directly projected through each of the side openings into said casings and then indirectly outward through the open ends of said casings, the forward edge of the top wall of the casing being in a position to interrupt upwardly and forwardly directed portions of the light beam projected from said casing, rearwardly flaring approximately horizontal auxiliary casings also arranged along the outer faces of the respective side walls but located forwardly of the first mentioned auxiliary casings and in a higher plane with their larger ends at the rear and terminating at positions adjacent the outer ends of the first mentioned auxiliary casings, and lamp-supporting means in the respective rearwardly flaring auxiliary casings.

3. A headlight of the character described comprising a casing provided with top, bottom and side walls of approximately tropezoidal form, each with its narower edge to the rear, and also having a rearwardly convexed back wall having its front edges joining the rear edges of the other walls, said top and bottom walls diverging forwardly from the back wall, said side walls extending forwardly and downwardly from the back wall in diverging relation, and joining the top and bottom walls respectively, in such manner that the front edges of the top, side and bottom walls define an inclined front opening of an approximately trapezoidal form, with the front edge of the top wall in a vertical plane which is in advance of the front edge of the bottom wall, each side wall having an opening therein contiguous to said back wall, and a reflector within said casing, said reflector having a front opening with the front edge of its upper portion in a vertical plane which is in advance of the front edge of the lower portion, so as to conform to the contour of the forward opening of said casing, the rear end of said reflector being spaced from and conforming to the contour of the back wall of the casing, said reflector also having side openings positioned to register with the side openings of the casing, and one or more lamp sockets extended through the rear end of the reflector and so located that lamps carried thereby will project beams through the registering openings of the reflector and the casing.

HERLUF NIELSEN.